US012576926B2

(12) United States Patent
Moradnia

(10) Patent No.: US 12,576,926 B2
(45) Date of Patent: Mar. 17, 2026

(54) PNEUMATIC BLADDER AERODYNAMIC DEVICE

(71) Applicant: Honda Motor Co., Ltd., Tokyo (JP)

(72) Inventor: Pirooz Moradnia, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 436 days.

(21) Appl. No.: 18/180,608

(22) Filed: Mar. 8, 2023

(65) Prior Publication Data

US 2024/0300593 A1     Sep. 12, 2024

(51) Int. Cl.
| | |
|---|---|
| *B62D 35/00* | (2006.01) |
| *F15D 1/00* | (2006.01) |
| *B62D 37/02* | (2006.01) |

(52) U.S. Cl.
CPC ........... *B62D 35/007* (2013.01); *F15D 1/007* (2013.01); *B62D 37/02* (2013.01)

(58) Field of Classification Search
CPC .... B62D 35/007; B62D 37/02; B62D 35/004; B62D 35/005–008; B62D 35/001; F15D 1/007
USPC ......... 296/180.1, 180.3, 180.4, 180.5, 181.5, 296/181.1
See application file for complete search history.

(56) References Cited

U.S. PATENT DOCUMENTS

| | | | |
|---|---|---|---|
| 4,441,751 A | 4/1984 | Wesley | |
| 7,040,690 B2 | 5/2006 | Soja et al. | |
| 8,292,350 B2 | 10/2012 | Li et al. | |

| | | | | |
|---|---|---|---|---|
| 8,677,817 B2 | 3/2014 | Li et al. | | |
| 8,764,078 B1 | 7/2014 | Lemonides | | |
| 10,173,736 B2 | 1/2019 | Ribaldone et al. | | |
| 10,308,294 B2 | 6/2019 | Yoon et al. | | |
| 10,604,195 B2 | 3/2020 | Tongue et al. | | |
| 2005/0248184 A1 | 11/2005 | Piffaretti | | |
| 2009/0284042 A1 * | 11/2009 | Jungert | .................. | B62D 37/02 |
| | | | | 296/180.1 |

(Continued)

FOREIGN PATENT DOCUMENTS

| | | | | | |
|---|---|---|---|---|---|
| DE | 3003565 C2 * | 11/1988 | ........... | B62D 35/007 | |
| DE | 10102756 A1 * | 7/2002 | .............. | B60J 7/223 | |

(Continued)

OTHER PUBLICATIONS

Translation for DE 10102756.*

(Continued)

*Primary Examiner* — Amy R Weisberg
*Assistant Examiner* — Denise Lynne Esquivel
(74) *Attorney, Agent, or Firm* — Rankin, Hill & Clark LLP

(57) ABSTRACT

A rear spoiler system for a vehicle includes a fluid supply system, an elastic bladder, and a frame. The bladder receives and confines a fluid delivered thereto by the fluid supply system. The bladder dilates upon an increase in a pressure inside the bladder resulting from an increase in the amount of the fluid confined therein, and contracts upon a decrease in the pressure inside the bladder resulting from a decrease in the amount of the fluid confined therein. A surface of the bladder defines an outer, exposed, and visible surface of the vehicle. The frame is arranged inside the bladder, defines a shape of the bladder, and moves with the bladder when the bladder dilates and contracts. When dilated, the upper surface of the bladder stands proud of an adjacent outer surface of the boot so as to act as a rear spoiler for the vehicle.

19 Claims, 6 Drawing Sheets

(56)     References Cited

U.S. PATENT DOCUMENTS

| | | | |
|---|---|---|---|
| 2012/0141271 A1 * | 6/2012 | Southwick | F03D 7/0232 |
| | | | 416/1 |
| 2017/0299006 A1 | 10/2017 | Shi et al. | |
| 2023/0347994 A1 | 11/2023 | Steenbeek et al. | |
| 2024/0300593 A1 | 9/2024 | Moradnia | |
| 2024/0417006 A1 | 12/2024 | Moradnia | |
| 2025/0121893 A1 | 4/2025 | Nastov et al. | |

FOREIGN PATENT DOCUMENTS

| | | | |
|---|---|---|---|
| DE | 102005047113 A1 * | 4/2007 | ............. B63B 1/322 |
| DE | 202017006243 U1 | 4/2019 | |
| DE | 102020103605 A1 | 8/2021 | |
| EP | 3601020 A1 | 2/2020 | |
| EP | 3426515 B1 | 11/2021 | |
| FR | 3089939 | 6/2020 | |
| FR | 3097520 | 12/2020 | |
| GB | 2475032 | 5/2011 | |
| GB | 2495983 A * | 5/2013 | ........... B62D 35/005 |
| WO | WO2018178579 A1 | 10/2018 | |

OTHER PUBLICATIONS

Translation for DE 10102756, date Jul. 25, 2002 (Year: 2002).*
Notice of Allowance of U.S. Appl. No. 18/180,632 dated Jun. 24, 2025, 13 pages.

\* cited by examiner

PNEUMATIC BLADDER AERODYNAMIC DEVICE

BACKGROUND

Vehicles include outer surfaces that have contours that affect the aerodynamics of the moving vehicle. These outer surfaces may be static and thus do not change shape, and may be part of a body panel or may be a structure attached to a body panel.

BRIEF DESCRIPTION

According to one aspect, a rear spoiler system is configured to attach to a vehicle. The rear spoiler system includes a fluid supply system, an elastic bladder, and a frame. The elastic bladder is in fluid communication with the fluid supply system, receives a fluid delivered by the fluid supply system, confines the fluid, and dilates upon an increase in a pressure inside the bladder resulting from an increase in an amount of the fluid confined in the bladder and/or contracts upon a decrease in the pressure inside the bladder resulting from a decrease in the amount of the fluid confined in the bladder. A surface of the bladder defines an outer, exposed, and visible surface of the vehicle. The frame is arranged inside the bladder, defines a shape of the bladder, and moves with the bladder when the bladder dilates or contracts.

According to another aspect, a vehicle includes a rear spoiler system. The rear spoiler system includes a fluid supply system, an elastic bladder, and a frame. The elastic bladder is in fluid communication with the fluid supply system, receives a fluid delivered by the fluid supply system, confines the fluid, and dilates upon an increase in a pressure inside the bladder resulting from an increase in an amount of the fluid confined in the bladder and/or contracts upon a decrease in the pressure inside the bladder resulting from a decrease in the amount of the fluid confined in the bladder. A surface of the bladder defines an outer, exposed, and visible surface of the vehicle. The frame is arranged inside the bladder, defines a shape of the bladder, and moves with the bladder when the bladder dilates or contracts.

DETAILED DESCRIPTION

Figure 1:
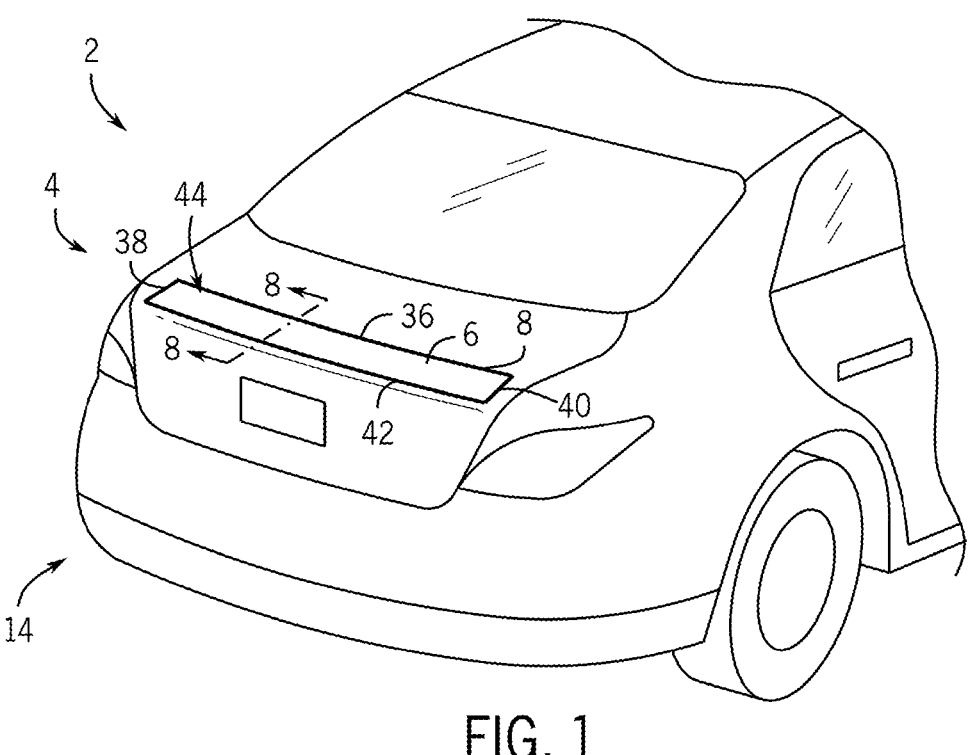
FIG. 1 is a partial perspective view of a rear of a vehicle with a rear spoiler system in a contracted state according to the present subject matter.

Referring to the figures, a vehicle 2 includes an inflatable rear spoiler system 4 including an elastic bladder 6, an internal frame 8 arranged inside the bladder 6, and a fluid supply system 10 fluidly connected to the bladder 6. The bladder 6 is stretched over the frame 8 whereby the frame 8 slightly dilates the bladder 6 to give the bladder 6 an initial shape in a contracted state (FIGS. 1, 2, 6, 8).

The fluid supply system 10 regulates an amount of fluid (e.g. a gas, air, or liquids) that is delivered to and contained inside the bladder 6. When fluid is delivered to the bladder 6 by the fluid supply system 10, the amount of fluid contained in the bladder 6 increases, causing an internal pressure inside the bladder 6 to increase, thus causing the bladder 6 to further dilate from the contracted state towards a dilated state (FIGS. 3-5, 7, 9, 10). When in the dilated state and when fluid is removed from the bladder 6, the fluid supply system 10 may remove fluid from the bladder 6, decreasing the amount of fluid contained in the bladder 6, thus decreasing the internal pressure inside the bladder 6 and allowing the bladder 6 to contract from the dilated state back towards the contracted state.

The frame 8 is attached to the inside surface 34 of the bladder 6 and may therefore move with the bladder 6 as it dilates and contracts. The frame 8 may be more rigid than the bladder 6, and may thereby support the bladder 6 (e.g. the upper side 50 of the bladder 6) in both the dilated state and the contracted state against a flow of air pushing against the bladder, such as while the vehicle 2 is moving for example, and may thus contribute to, support, or define a shape of the bladder 6 in both the dilated state and the contracted state.

The vehicle 2 associated with the rear spoiler system 4 is not particularly limited, and may be any of a variety of vehicles include a motor vehicle or a non-motor vehicle; for example a bicycle, car, truck, van, bus, scooter, motorcycle, train, plane, boat, or any other vehicle used to transport goods or people. In a non-limiting example, the vehicle 2 is a motor vehicle. The vehicle 2 includes a head at its front, and a tail or boot 14 at its back. The boot 14 may be a trunk covering of the vehicle 2, which may cover a storage compartment or an engine compartment (FIGS. 1-5), or the boot 14 may be a rear portion of a roof of a vehicle (FIGS. 6-7). The bladder 6 may be arranged on a rear body panel of the vehicle (trunk or roof), for example at the back of the vehicle 2 on the boot 14 of the vehicle 2 to act as a rear spoiler for the vehicle 2.

The bladder 6 is elastic, which means it has an at-rest shape when not subject to strain; it can contract, dilate, or distort when subject to a strain; and then it is able to resume its at-rest shape spontaneously after such contraction, dilatation, or distortion when the strain is no longer present.

The frame 8, which is arranged inside the bladder 6, may exert an outward strain on the bladder 6 and dilate the bladder 6 from the at-rest shape to the contracted state (FIGS. 1, 2, 6, 8), where the bladder 6 is stretched around the frame 8.

The bladder 6 may dilate upon an increase in a pressure inside the bladder 6 resulting from an increase in an amount of the fluid confined in the bladder 6, and/or may contract upon a decrease in the pressure inside the bladder 6 resulting from a decrease in the amount of the fluid confined in the bladder 6.

The fluid may be delivered inside the bladder 6, i.e. to an enclosed volume 16 defined by the bladder 6, and may thus exert additional strain on the bladder 6 so as to further dilate the bladder 6 from the contracted state toward the dilated state.

When the fluid is removed/expelled from the bladder 6, the internal pressure decreases, allowing the bladder 6 to elastically contract back toward the contracted state.

The bladder 6 is in fluid communication, via an aperture 18, with the fluid supply system 10, which delivers fluid to the bladder 6 through this fluid communication channel. The bladder 6 received the fluid and confines the fluid in the enclosed volume 16, and may dilate from the contracted state towards the dilated state upon an increase in a pressure inside the bladder 6 resulting from an increase in the amount of the fluid confined in the bladder 6. The bladder 6 may contract back from the dilated state towards the contracted state upon a decrease in the pressure inside the bladder 6 resulting from a decrease in the amount of the fluid confined in the bladder 6. The fluid supply system 10 may also remove the fluid from the enclosed volume 16 of the bladder 6. Thus the fluid supply system 10 may thereby regulate the amount of fluid confined in the bladder 6.

The bladder 6, and more specifically, the enclosed volume 16, is in fluid communication with the fluid supply system 10 via the aperture 18, which extends through a wall of the bladder 6 and provides access into the enclosed volume 16. This configuration allows the fluid to be delivered from the fluid supply system 10, through the aperture 18, and into the enclosed volume 16.

Other than for the aperture 18, the bladder 6 may be substantially fluid-tight, meaning that the fluid can be contained inside the bladder 6 and not leak out via mass flow, although diffusion/permeation of the fluid out of the bladder 6 through the material of the bladder 6 is still possible. The material used to make the bladder 6 is not particularly limited, and may include various polymers and polymer composites that are elastic and substantially fluid-tight.

The fluid supply system 10 may include a fluid supply 20 including a compressor, an adaptor 22 sealing to the bladder 6 around the aperture 18, and a tube 24 connecting the fluid supply 20 to the adaptor 22. The compressor of the fluid supply 20 may urge the fluid from the fluid supply 20, through the tube 24, through the adaptor 22, and into the enclosed volume 16. The fluid supply system 10 may prevent the fluid from leaking out of the enclosed volume 16 through the aperture 18, e.g. by use of a valve. The compressor may be an air compressor. The fluid supply system 10 can have other known configurations.

When the fluid is delivered to the bladder 6, the internal pressure (outward strain) within the bladder 6 may increase due to the increased amount of fluid contained in the bladder 6, which may cause the bladder 6 to dilate outward from the contracted state toward the dilated state. When the fluid is removed from the bladder 6, e.g. through the tube 24 and back to the fluid supply 20, the internal pressure (outward strain) within the bladder 6 may thereby decrease, which may allow the elastic bladder 6 to elastically contract back toward the contracted state.

The bladder 6 is arranged on an outside surface of the boot 14 of the vehicle 2 so as to act in the dilated state as a rear spoiler for the vehicle 2. The bladder 6 may be arranged in a depression 26 in the boot 14, with a top/upper, exposed, and visible surface 28 of bladder 6 defining an outer, exposed, and visible surface of the boot 14 of the vehicle 2. That is, the bladder 6 is not covered or concealed by other components, panels, or parts. However, the bladder 6 may have a surface coating applied thereto, such as a coating of paint, varnish, enamel, etc. which dilates and contracts along with the bladder 6 as it dilates and contracts.

When the internal pressure inside the bladder 6 equals the pressure outside the bladder 6 (e.g. the atmospheric pressure), the bladder 6 may be in the contracted state and the upper surface 28 of the bladder 6 may be flush with an adjacent outer surface 30 of the boot 14. This is not required, and the bladder 6 may not be arranged in the depression 26, and/or the upper surface 28 of the bladder 6 may stand proud of or be below the adjacent outer surface 30 of the boot 14 when the internal pressure inside the bladder 6 equals the pressure outside the bladder 6. The upper surface 28 of the bladder 6 may have the same or different aesthetic appearance as the adjacent surface 30 of the boot 14.

When the internal pressure inside the bladder 6 is greater than the pressure outside the bladder 6, the bladder 6 may be in the dilated state or be between the contracted state and the dilated state, by fluid being delivered to the bladder 6 to make it dilate toward the dilated state. When the internal pressure inside the bladder 6 is greater than the pressure outside the bladder 6, the upper surface 28 of the bladder 6 may stand proud of the adjacent outer surface 30 of the boot 14 of the vehicle 2 and thereby acts as a rear spoiler for the vehicle 2.

The bladder 6 may be connected to the boot 14, by a lower side 52/lower surface 32 of the bladder 6 being in contact with, and directly connected to, the boot 14. The lower surface 32 of the bladder may be directly connected to the boot 14 in the depression 26. When the bladder 6 is dilated, the upper surface 28/upper side 50 of the bladder 6, which is not directly connected to the boot 14, may move away (e.g. upward) from the boot 14 and from the lower side 52/lower surface 32, which is attached to the boot 14. The lower surface 32 of the bladder 6 may be connected to the boot 14 by an adhesive, mechanical fasteners, welding, or otherwise. The bladder 6 may (also) be connected to the boot 14 by the frame 8 being connected to the boot 14, such as by fasteners, not shown, extending from the frame 8, through the bladder 6, and to the boot 14, and directly connecting the frame 8 to the boot 14. These fasteners may connect non-moving portions of the frame 8 with the boot 14.

The frame 8 is not particularly limited in shape and construction, is arranged inside the bladder 6, and stretches the bladder 6 to define a shape of the bladder 6 (e.g. a perimeter of the shape of the bladder 6) in the contracted state. Being inside the bladder 6, the frame 8 may not be visible, but is nonetheless schematically depicted in FIGS. 1-5 with thicker lines to show the configuration of the frame 8 with respect to the bladder 6 and the vehicle 2.

The frame 8 may include at least two sides that are arranged around or surrounding an open center 44 with the sides defining the perimeter of the shape of the bladder 6. As seen in the figures, the frame 8 may include four sides 36, 38, 40, 42 surrounding the open center 44. The frame 8 with the four sides 36, 38, 40, 42 may have a general curved rectangle shape when looking from above, or any other shape, which is thus imparted to the bladder 6 to give the bladder 6 the same general shape in the contracted state as the shape of the frame 8. This general curved rectangle shape and this configuration of the frame 8 is not required, and the frame 8 may have more or less sides, including more than four sides, and a different shape.

Figure 2:
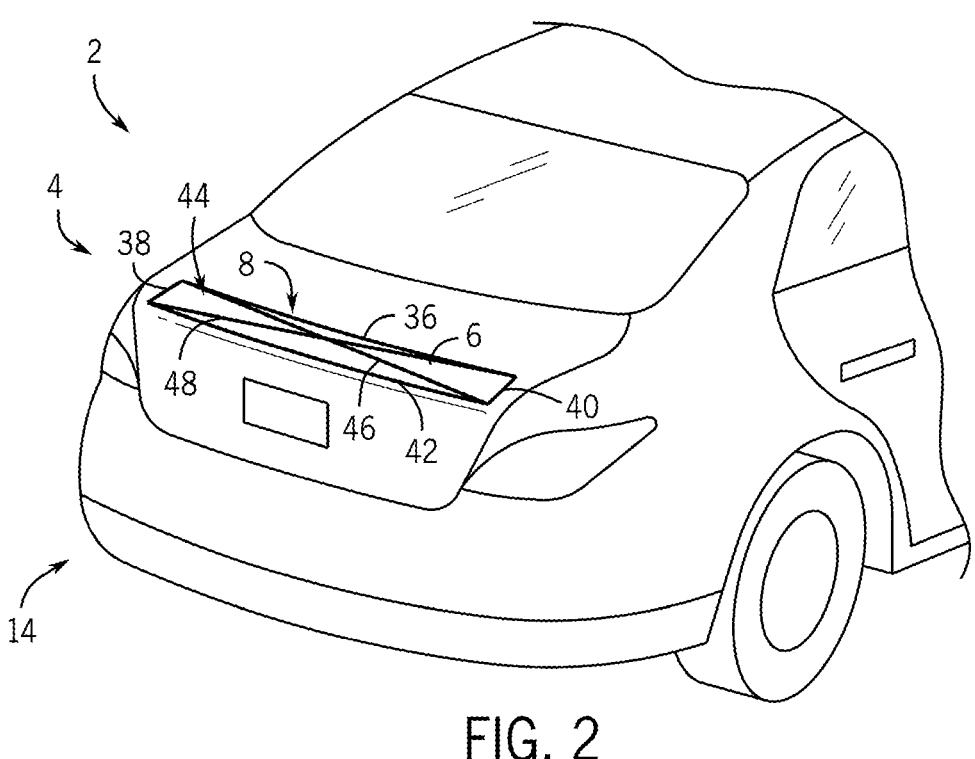
FIG. 2 is a partial perspective view of a rear of a vehicle with another rear spoiler system in a contracted state according to the present subject matter.

The frame 8 may also include cross members extending through the open center 44 and connecting two opposite sides of the frame 8. As shown in FIG. 2, two cross members 46, 48 crisscross each other, and connect the front side 36 and the opposite rear side 42. This is not required, and there may be more or less sides, more or less cross members, the cross members may not crisscross each other, and the cross members may connect different sides of the frame 8 together.

The frame 8 is arranged inside the bladder 6, i.e. in the enclosed volume 16. The frame 8 may be connected to the bladder 6, e.g. by being connected to an inside surface 34 of the bladder 6. The frame 8 may be connected to the inside surface 34 of the upper side 50 of the bladder 6 by adhesive. When the bladder 6 is dilated, the frame 8, or portions thereof (moving portions), may move with the bladder 6 as it dilates, and optionally other portions of the frame 8 (non-moving portions) may not move when the bladder 6 dilates.

The frame 8 may be a passive shape-imparting structure for the bladder 6, in that the frame 8 does not actively move on its own to impart a shape to the bladder 6, but is moved by the bladder 6 when the bladder dilates and contracts. In other words, the frame 8 may move because the fluid is delivered or removed from the bladder 6. The frame 8 may thus impart a shape to the bladder 6 by the bladder 6 being stretched around the frame 8 and by the frame 8 being attached to the inside surface 34 of the bladder 6.

When the bladder 6 dilates and contracts, a rear side (e.g. the rear side 42) of the frame 8 may move with the dilating bladder 6, while at least one other side of the frame 8 does not move with the bladder 6 as it dilates and contracts.

Figure 3:
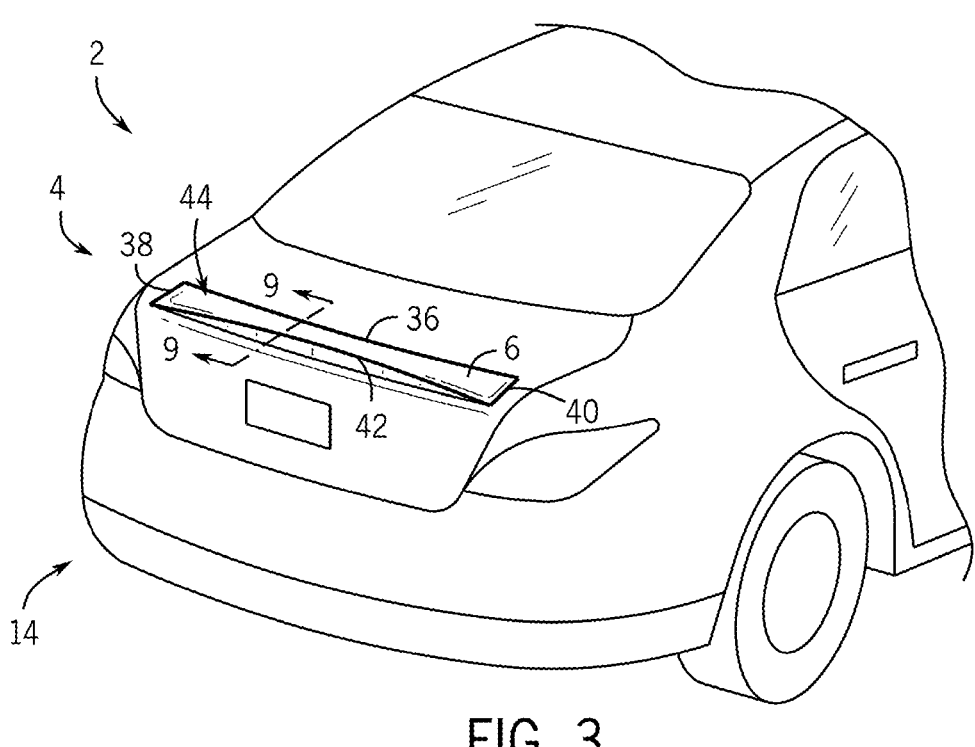
FIG. 3 is a partial perspective view of a rear of a vehicle with a rear spoiler system in a dilated state according to the present subject matter.
Figure 4:
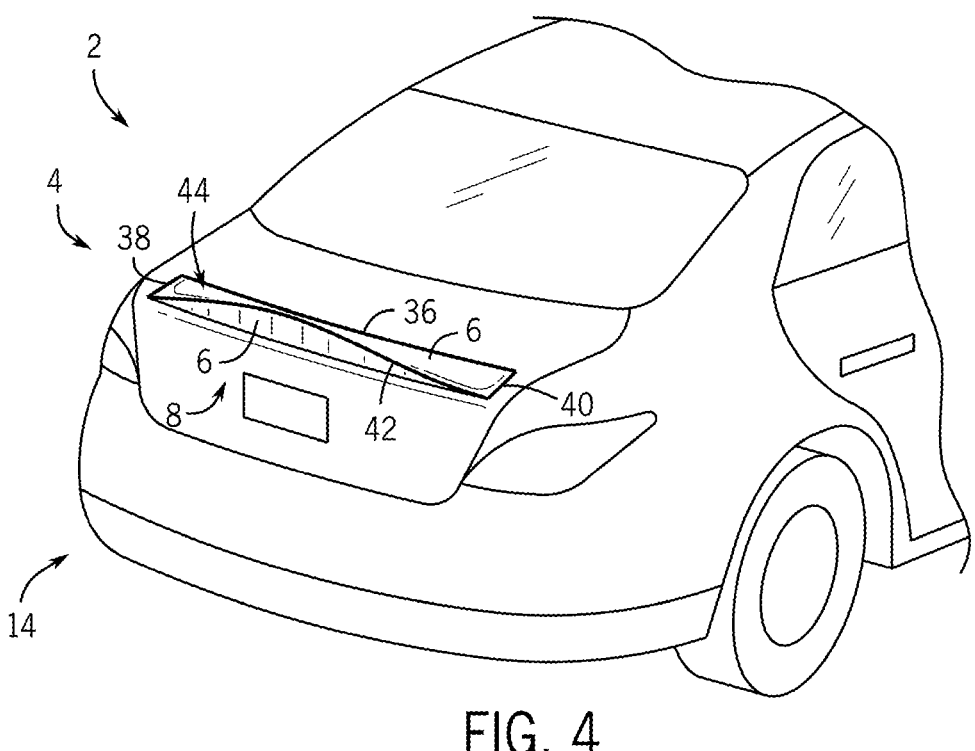
FIG. 4 is a partial perspective view of the rear of the vehicle of FIG. 3, with the rear spoiler system being even further dilated.
Figure 9:
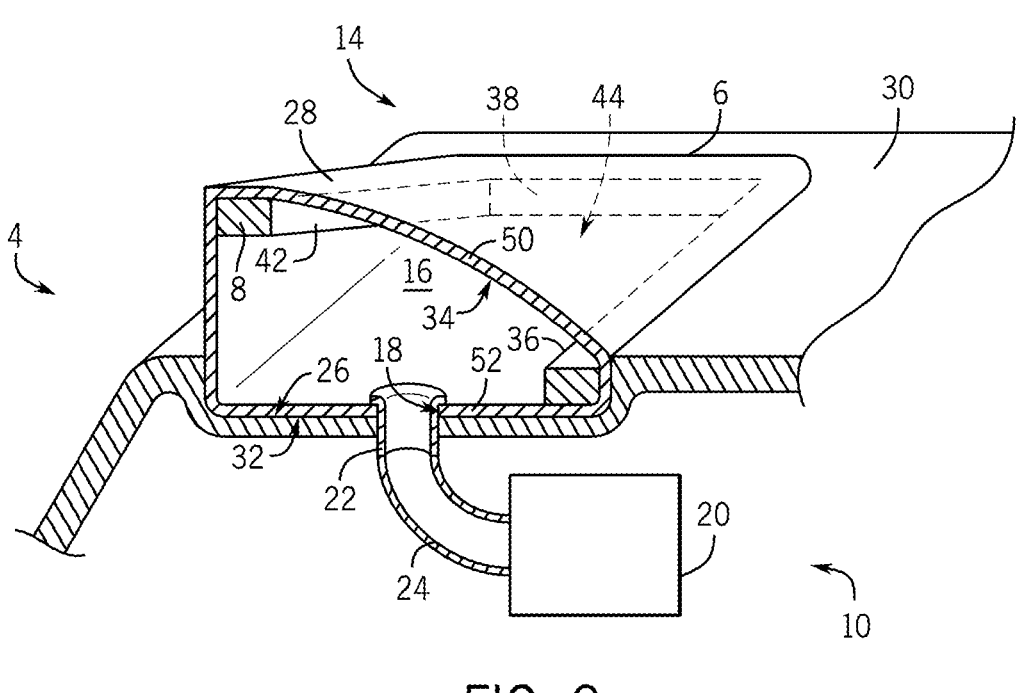
FIG. 9 is a cross-section view the rear spoiler system of FIG. 3 taken along line 9-9.

In a non-limiting example shown in FIGS. 3, 4, and 9, three of the four sides (i.e. the front side 36 and two lateral sides 38, 40) are non-moving portions of the frame 8 and do not move with respect to (away from) the vehicle 2 when the bladder 6 is dilating and contracting, while a fourth side of the frame (i.e. the rear side 42) is a moving-portion of the frame 8 and does move along with the dilating bladder 6 and with respect to the vehicle 2 (upward away from the boot 14) when the bladder 6 is dilating and contracting. As shown in FIGS. 3-4, the rear side 42 bends upward when the bladder 6 is dilating forming an upward arc with an apex of the upward arc arranged between two ends of the rear side 42 (FIGS. 3-4). The rear side 42 bends downward from the upward arc back toward the initial position (FIG. 8) when the bladder 6 is contracting.

Figure 5:
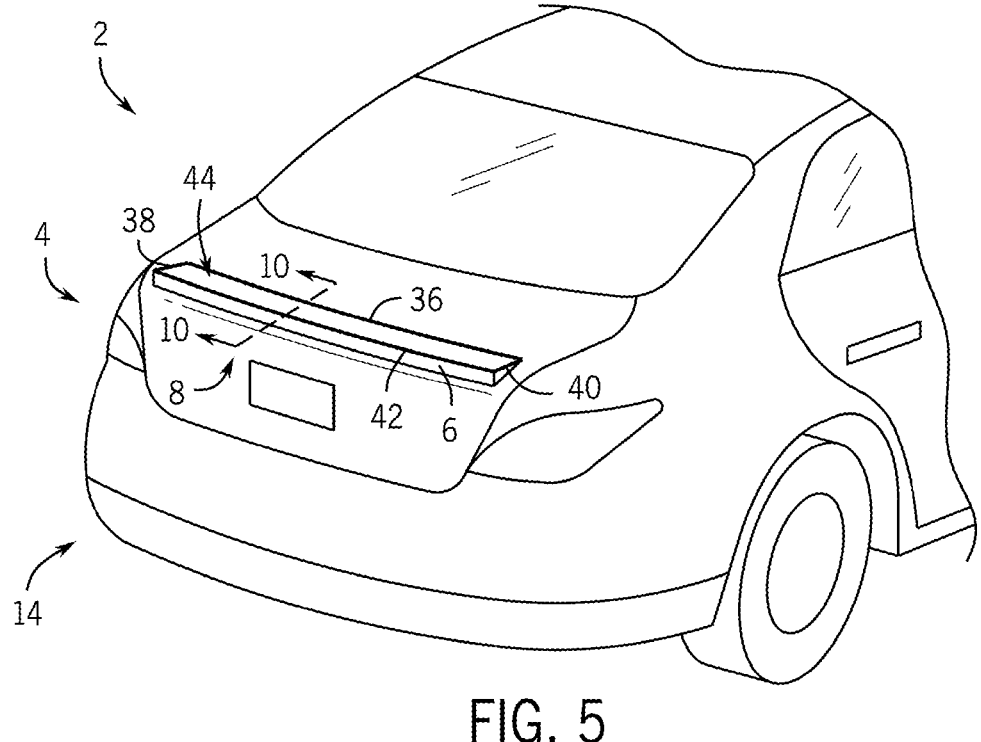
FIG. 5 is a partial perspective view of a rear of a vehicle with another rear spoiler system in a dilated state according to the present subject matter.
Figures 6, 7:
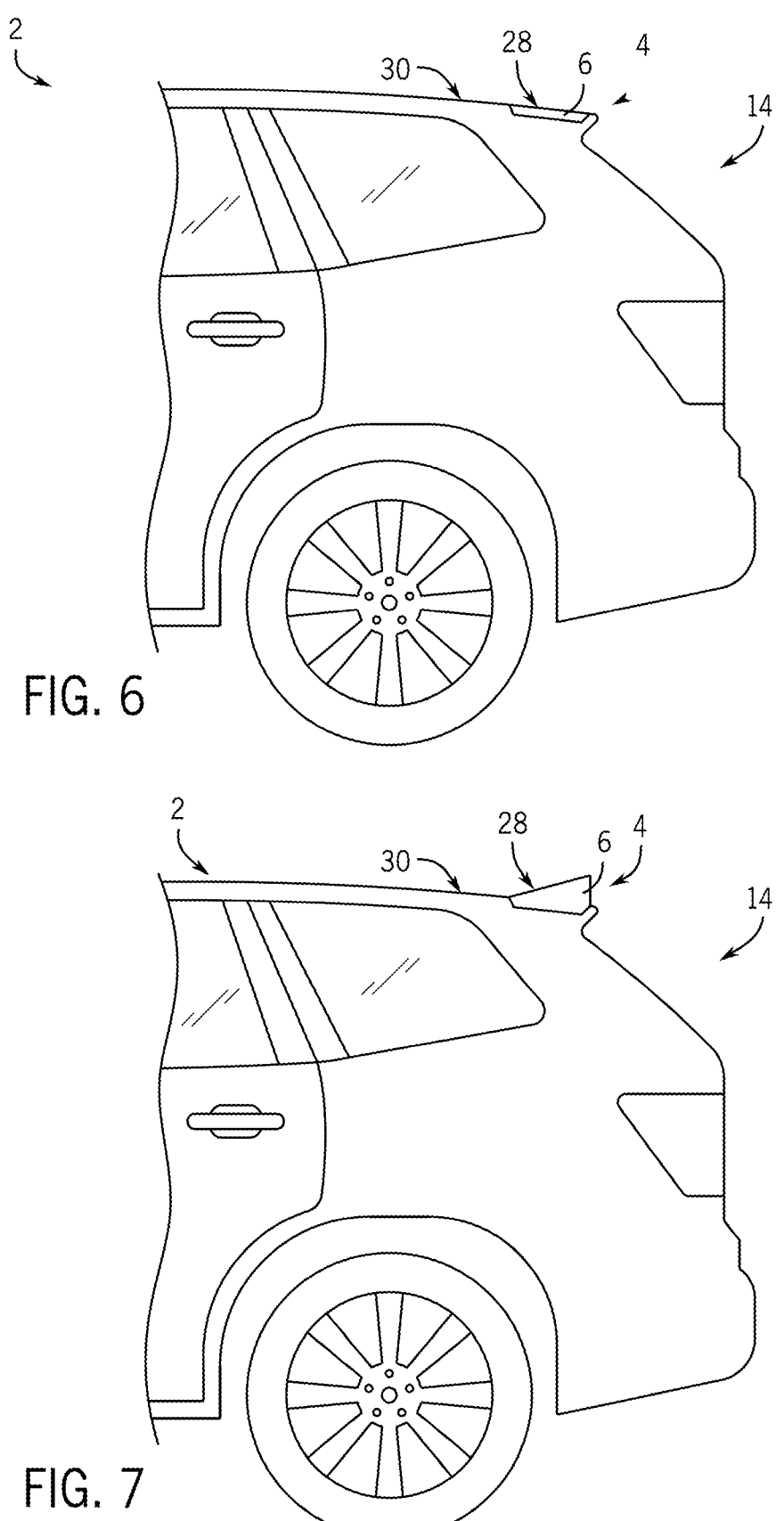
FIG. 6 is a partial side view of a vehicle with a rear spoiler system in a contracted state according to the present subject matter.
FIG. 7 is a partial side view of the vehicle of FIG. 7 with the rear spoiler system in a dilated state.
Figure 8:
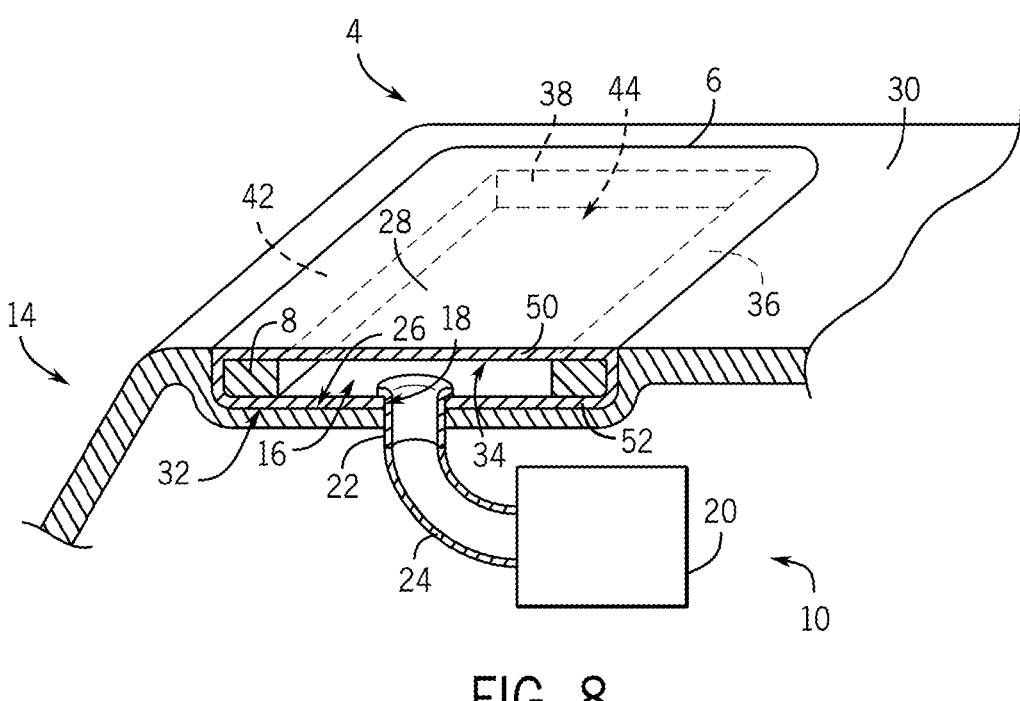
FIG. 8 is a cross-section view of the rear spoiler system of FIG. 1 taken along line 8-8.
Figure 10:
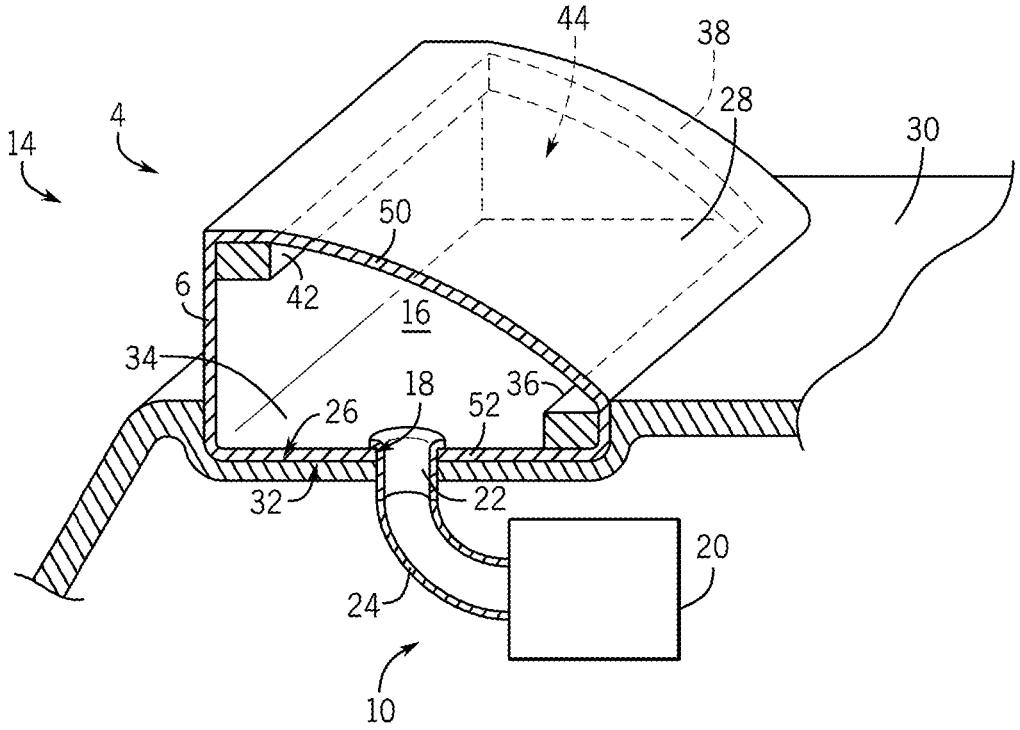
FIG. 10 is a cross-section view of the rear spoiler system of FIG. 5 taken along line 10-10.

In a non-limiting example shown in FIGS. 5 and 10, the front side 36 remains stationary with respect to the vehicle 2 and is a non-moving portion of the frame 8 when the bladder 6 is dilating, while the two lateral sides 38, 40 and the rear side 42 move with the inflating bladder 6 and with respect to the vehicle (upward away from the boot 14) when the bladder 6 is dilating. The two lateral sides 38, 40 angle upward from their front ends, which are secured to the front side 36, to their rear ends. The rear side 42 of the frame 8 extends between the elevated rear ends of the two lateral sides 38, 40.

The frame 8 may be an active shape-imparting structure for the bladder 6, in that the frame 8 moves on its own, separate and apart from the bladder 6 dilating and contracting, so as to actively impart a shape to the bladder 6. The frame 8 may change shape, move (e.g. up and down), or otherwise actively impart a shape to the bladder 6. When active, the frame 8 may impart one shape to the bladder 6 in the contracted state, and another different shape to the bladder 6 in the dilated state. The frame 8 may actively move via a spring tension in the frame 8 itself, or via an external mechanism that exerts a moving force to the frame 8.

When the frame 8 is a passive or active shape-imparting structure, the shape of the bladder 6 in the dilated state may be a function of the frame 8 shape as well as a function of the fluid in the enclosed volume 16 exerting an outward strain on the bladder 6 pressing against the inside surface 34 of the bladder 6.

The frame 8 is more rigid than the bladder 6, and thus adds rigidity to the elastic bladder 6 and supports the bladder 6. When air flows over the dilated bladder 6 in the dilated state or in the contracted state, e.g. during vehicle 2 movement or wind gusts, the frame 8 provides resistance to compression of the bladder, e.g. the upper side 50 of the bladder 6, against the airflow, and helps to maintain a shape of the bladder 6 in the dilated state, as well as in the contracted state. In the dilated state, the frame 8 may inhibit the bladder 6 from being pushed back down toward the vehicle or changing shape when subjected to the airflow. When in the dilated state and the contracted state, the frame 8 may inhibit the bladder 6 from flapping in the wind and making noise. In the contracted state, the frame 8 may stretch the bladder 6 so that the upper surface 28 stretches substantially flat across the open center 44 of the frame 8 and thus provide a similar appearance as the adjacent surface 30 of the boot 14. The frame 8 may define at least a portion of the shape of the bladder 6 in the dilated state, for example by restricting the dilation of the bladder 6 so that the dilated bladder 6 assumes a desired shape. The frame 8 may also support the upper side 50 of the bladder 6 when the pressure inside the bladder 6 is less than the pressure outside the bladder 6.

The frame 8 is also elastic, and thus can bend, dilate, or distort with the bladder 6 as the bladder 6 dilates, and also the frame 8 returns to an initial position (FIG. 8) when the bladder 6 is contracted. The frame 8 may be formed of metal, polymers, or other materials and composites thereof.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A rear spoiler system configured to attach to a vehicle, the rear spoiler system comprising:

a fluid supply system;

an elastic bladder in fluid communication with the fluid supply system, receiving a fluid delivered by the fluid supply system, confining the fluid, and dilating upon an increase in a pressure inside the bladder resulting from an increase in an amount of the fluid confined in the bladder and/or contracting upon a decrease in the pressure inside the bladder resulting from a decrease in the amount of the fluid confined in the bladder, wherein a surface of the bladder defines an outer, exposed, and visible surface of the vehicle; and a frame arranged inside the bladder, defining a shape of the bladder, and moving with the bladder when the bladder dilates and contracts, wherein the frame defines a perimeter of the shape of the bladder and includes an open center, and wherein the frame includes cross members extending through the open center and connecting two opposite sides of the frame.

2. The rear spoiler system according to claim 1, wherein the bladder is configured to be attached to a boot of the vehicle such that an upper surface of the bladder is extending above an adjacent outer surface of the boot when the pressure inside the bladder is greater than a pressure outside the bladder.

3. The rear spoiler system according to claim 2, wherein the bladder is configured to be attached to the boot of the vehicle such that the upper surface of the bladder is flush with the adjacent outer surface of the boot when the pressure inside the bladder is equal to the pressure outside the bladder.

4. The rear spoiler system according to claim 1, wherein the frame stretches the bladder to define the shape of the bladder.

5. The rear spoiler system according to claim 1, wherein the frame includes at least two sides around the open center.

6. The rear spoiler system according to claim 5, wherein at least one side of the frame does not move with respect to the vehicle when the bladder is dilating and contracting, and a rear side of the frame moves with respect to the vehicle when the bladder is dilating and contracting.

7. The rear spoiler system according to claim 6, wherein the rear side bends upward when the bladder is dilating and/or bends downward when the bladder is contracting.

8. The rear spoiler system according to claim 7, wherein the rear side bends upward when the bladder is dilating forming an upward arc with an apex of the upward arc arranged between two ends of the rear side.

9. The rear spoiler system according to claim 1, wherein:
the frame is connected to an upper side of the bladder; and
a lower side of the bladder is configured to be connected to the vehicle.

10. The rear spoiler system according to claim 1, wherein the fluid is air.

11. A vehicle including a rear spoiler system, the rear spoiler system comprising:
a fluid supply system;
an elastic bladder in fluid communication with the fluid supply system, receiving a fluid delivered by the fluid supply system, confining the fluid, and dilating upon an increase in a pressure inside the bladder resulting from an increase in an amount of the fluid confined in the bladder and/or contracting upon a decrease in the pressure inside the bladder resulting from a decrease in the amount of the fluid confined in the bladder, wherein a surface of the bladder defines an outer, exposed, and visible surface of the vehicle; and
a frame arranged inside the bladder, defining a shape of the bladder, and moving with the bladder when the bladder dilates and contracts, wherein at least one side of the frame does not move with respect to the vehicle when the bladder is dilating and contracting, and a rear side of the frame moves with respect to the vehicle when the bladder is dilating and contracting, and further wherein when the bladder is dilating, the rear side bends upward forming an upward arc with an apex of the upward arc arranged between two ends of the rear side, and wherein when the bladder is contracting, the rear side bends downward.

12. The vehicle according to claim 11, wherein the bladder is connected to a boot of the vehicle such that when a pressure inside the bladder is greater than a pressure outside the bladder, an upper surface of the bladder is extended above an adjacent outer surface of the boot.

13. The vehicle according to claim 12, wherein the bladder is connected to a boot of the vehicle such that when the pressure inside the bladder is equal to the pressure outside the bladder, the upper surface of the bladder is flush with the adjacent outer surface of the boot.

14. The vehicle according to claim 12, wherein:
the frame stretches the bladder to define the shape of the bladder, and
the bladder and the frame are arranged in a depression in the boot of the vehicle.

15. The vehicle according to claim 14, wherein the frame defines a perimeter of the shape of the bladder, and the frame includes an open center.

16. The vehicle according to claim 15, wherein the frame includes at least two sides around the open center.

17. The vehicle according to claim 16, wherein the frame includes cross members extending through the open center and connecting two opposite sides of the frame.

18. A rear spoiler system configured to attach to a vehicle, the rear spoiler system comprising:
a fluid supply system including a compressor;
an elastic bladder in fluid communication with the fluid supply system via an aperture extending through a wall of the bladder, the bladder receiving a fluid delivered by the fluid supply system and confining the fluid in an enclosed volume defined by the bladder, wherein the bladder dilates upon an increase in a pressure inside the bladder resulting from an increase in an amount of the fluid confined in the bladder and contracts upon a decrease in the pressure inside the bladder resulting from a decrease in the amount of the fluid confined in the bladder, and wherein an upper surface of the bladder defines an outer, exposed, and visible surface of the vehicle, wherein the upper surface of the bladder has the same aesthetic appearance as an adjacent surface of a boot of the vehicle; and
a frame arranged inside the bladder and connected to an inside surface of the bladder, wherein the frame is more rigid than the bladder and supports the bladder against airflow, and wherein the frame defines a shape of the bladder and moves with the bladder when the bladder dilates and contracts.

19. The rear spoiler system according to claim 18, wherein the bladder is configured to be arranged in a depression in the boot of the vehicle such that when the pressure inside the bladder is equal to a pressure outside the bladder, the upper surface of the bladder is flush with the adjacent surface of the boot, and when the pressure inside the bladder is greater than the pressure outside the bladder, the surface of the bladder extends above the adjacent surface of the boot and functions as a rear spoiler.

* * * * *